US009824696B2

(12) United States Patent
Oda

(10) Patent No.: US 9,824,696 B2
(45) Date of Patent: Nov. 21, 2017

(54) NOISE REDUCTION APPARATUS, NOISE REDUCTION METHOD, AND PROGRAM

(71) Applicant: JVC KENWOOD Corporation, Yokohama-shi, Kanagawa (JP)

(72) Inventor: Keisuke Oda, Yokohama (JP)

(73) Assignee: JVC KENWOORD CORPORATION, Yokohama-Shi, Kanagawa (JP)

( * ) Notice: Subject to any disclaimer, the term of this patent is extended or adjusted under 35 U.S.C. 154(b) by 0 days.

(21) Appl. No.: 15/073,476

(22) Filed: Mar. 17, 2016

(65) Prior Publication Data

US 2016/0284362 A1 Sep. 29, 2016

(30) Foreign Application Priority Data

Mar. 24, 2015 (JP) ................................ 2015-060438

(51) Int. Cl.
*H04B 15/00* (2006.01)
*G10L 21/0208* (2013.01)
*G10L 21/0216* (2013.01)

(52) U.S. Cl.
CPC *G10L 21/0208* (2013.01); *G10L 2021/02165* (2013.01)

(58) Field of Classification Search
CPC ...................................................... H04B 15/00
See application file for complete search history.

(56) References Cited

U.S. PATENT DOCUMENTS

| | | | | |
|---|---|---|---|---|
| 5,838,802 | A * | 11/1998 | Swinbanks ........... | F16F 15/002 381/71.1 |
| 8,447,045 | B1 * | 5/2013 | Laroche .................. | A61F 11/14 381/71.1 |
| 2002/0118609 | A1 | 8/2002 | Saito et al. | |
| 2003/0007657 | A1 * | 1/2003 | Ludvigsen ........... | H04R 25/356 381/312 |
| 2013/0163748 | A1 * | 6/2013 | Khanduri .............. | H04M 9/082 379/406.08 |
| 2013/0163772 | A1 * | 6/2013 | Kobayashi ........... | G10K 11/175 381/71.1 |
| 2014/0180682 | A1 * | 6/2014 | Shi ...................... | G10L 21/0216 704/207 |

(Continued)

FOREIGN PATENT DOCUMENTS

| | | |
|---|---|---|
| JP | 2002-251823 | 9/2002 |
| JP | 2011-205598 | 10/2011 |
| JP | 2015018113 A | 1/2015 |

*Primary Examiner* — Olisa Anwah
(74) *Attorney, Agent, or Firm* — Procopio, Cory Hargreaves & Savitch LLP

(57) ABSTRACT

Provided is a noise reduction apparatus, a noise reduction method, and a program for generating voice that is easy to hear while reducing sudden sound. The noise reduction apparatus includes a first microphone configured to collect mainly voice and output the voice as a first signal, a second microphone configured to collect mainly sound other than the voice and output the sound as a second signal, a sudden sound detecting unit configured to detect sudden sound in the first signal and the second signal, a sudden sound information storage unit configured to store the sudden sound as one or a plurality of reference signals, and an adder configured to remove the sudden sound from the first signal based on the reference signal stored in the sudden sound information storage unit.

10 Claims, 7 Drawing Sheets

(56) References Cited

U.S. PATENT DOCUMENTS

| | | | | |
|---|---|---|---|---|
| 2014/0211953 | A1* | 7/2014 | Alderson | G10K 11/1784 381/56 |
| 2015/0098578 | A1* | 4/2015 | Dadu | H04M 9/082 381/66 |
| 2015/0172811 | A1* | 6/2015 | Sassi | H04R 3/002 381/71.1 |
| 2015/0172813 | A1* | 6/2015 | Goto | G10K 11/1784 381/71.1 |
| 2016/0044151 | A1* | 2/2016 | Shoemaker | H04M 19/04 455/556.1 |
| 2016/0125865 | A1* | 5/2016 | Shahmurad | G10L 21/0208 381/71.4 |

* cited by examiner

NOISE REDUCTION APPARATUS, NOISE REDUCTION METHOD, AND PROGRAM

CROSS REFERENCE TO RELATED APPLICATION

This application is based upon and claims the benefit of priority from Japanese patent application No. 2015-060438, filed on Mar. 24, 2015, the disclosure of which is incorporated herein in its entirety by reference.

BACKGROUND

The present invention relates to a noise reduction apparatus. More specifically, the present invention relates to a noise reduction apparatus for reducing sudden sound while leaving a voice signal in an environment where the sudden sound is periodically included in the voice signal.

In related art, there has been a problem that when voice communication is performed using a mobile communication device or the like such as a cellular phone and radio equipment, ambient noise generated in a surrounding environment is mixed in voice, which is original target sound, thereby making it difficult for a receiver to hear the voice. Therefore, a noise reduction process has been widely used as a method of ensuring clarity of the voice. A typical method of the noise reduction process is an adaptive noise reduction process using an adaptive filter. The adaptive filter sequentially changes a characteristic of a filter for reducing the noise in accordance with a change in an environment. That is, the adaptive filter is characterized by being adaptable to an environment. More specifically, by sequentially changing a filter coefficient according to place and time while operating the filter to eliminate only noise components that change according to the place and the time, the adaptive filter is adapted to an environment and ambient noise can be reduced.

There are various kinds of ambient noise. For example, an oxygen cylinder carried by a firefighter at a site of a fire has a function to alert a wearer by vibration sound when a tank capacity becomes less than or equal to a predetermined value. Further, operating noise of a ground compactor is generated at a construction site. Such vibration sound and operating sound is persistent and periodic sudden sound. When radio equipment or the like is used in a state where the sudden sound is generated, the sudden sound is mixed in the radio equipment or the like together with the voice, making it extremely difficult for a receiver to hear the voice.

In order to use the above-mentioned adaptive noise reduction process for reducing the persistent and periodic sudden sound, it is necessary to constantly operate an adaptive signal processing circuit (an adaptive filter circuit). This increases the number of taps in the circuit, thereby increasing the circuit size.

In regard to this matter, Japanese Unexamined Patent Application Publication No. 2002-251823 discloses a method of reducing noise generated in a lens moving part of a camcorder, noise when a head comes into contact with or moves away from a magnetic tape, sound of an optical shutter of a camcorder having a silver salt film camera function, and sudden sound generated during, for example, head seeking at the time of recording on a rotating recording medium. To be more specific, the method blocks signals only in a section where the sudden sound is generated and interpolates lacking information in a blocked section based on voice signals in at least one of before and after the blocked section.

A method disclosed in Japanese Unexamined Patent Application Publication No. 2011-205598 calculates an envelope of a signal including sudden noise, extracts a signal component of the sudden noise, and reduces only the signal component of the sudden noise from the signal including the sudden noise.

In the method disclosed in Japanese Unexamined Patent Application Publication No. 2002-251823, if the signals included in the blocked section is mostly only the sudden sound, a desirable effect can be achieved. However, when the sudden sound is superimposed in the voice section, the voice cannot be appropriately interpolated, bringing a feeling of strangeness to the receiver side.

Further, the method disclosed in Japanese Unexamined Patent Application Publication No. 2011-205598 reduces the signal components specific to the sudden sound (frequency components greater than or equal to 4 kHz not including voice components). The above-mentioned persistent and periodic sudden sound such as the vibration sound or the like usually have components dispersed over various frequencies which overlap with frequency components of voice. It is therefore difficult to detect the sudden sound by this method, and when the sudden sound is reduced, the voice may also be reduced by this method.

In voice communication using a mobile communication device or the like, it is important that a receiver can easily hear voice. However, the present inventor has found a problem that in the above-mentioned conventional sudden sound reduction and interpolation methods, voice with a feeling of strangeness is generated.

SUMMARY

An exemplary aspect of the present embodiment is a noise reduction apparatus including: a first microphone configured to collect mainly voice and output the voice as a first signal; a second microphone configured to collect mainly sound other than the voice and output the sound as a second signal; a sudden sound detecting unit configured to detect sudden sound in the first signal and the second signal; a sudden sound information storage unit configured to store the sudden sound as one or a plurality of reference signals; and an adder configured to remove the sudden sound from the first signal based on the reference signal stored in the sudden sound information storage unit.

Another exemplary aspect is a method of reducing noise including steps of: collecting mainly voice and outputting the voice as a first signal; collecting sound other than the voice and outputting the sound as a second signal; detecting sudden sound in the first signal and the second signal; storing the sudden sound as one or a plurality of reference signals; and removing the sudden sound from the first signal based on the reference signal stored in the step of storing the sudden sound.

Still another exemplary aspect is a program for causing a computer to execute the above-mentioned method of reducing the noise.

It is possible to provide a noise reduction apparatus, a noise reduction method, and a program for generating voice that is easy to hear while reducing sudden sound.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
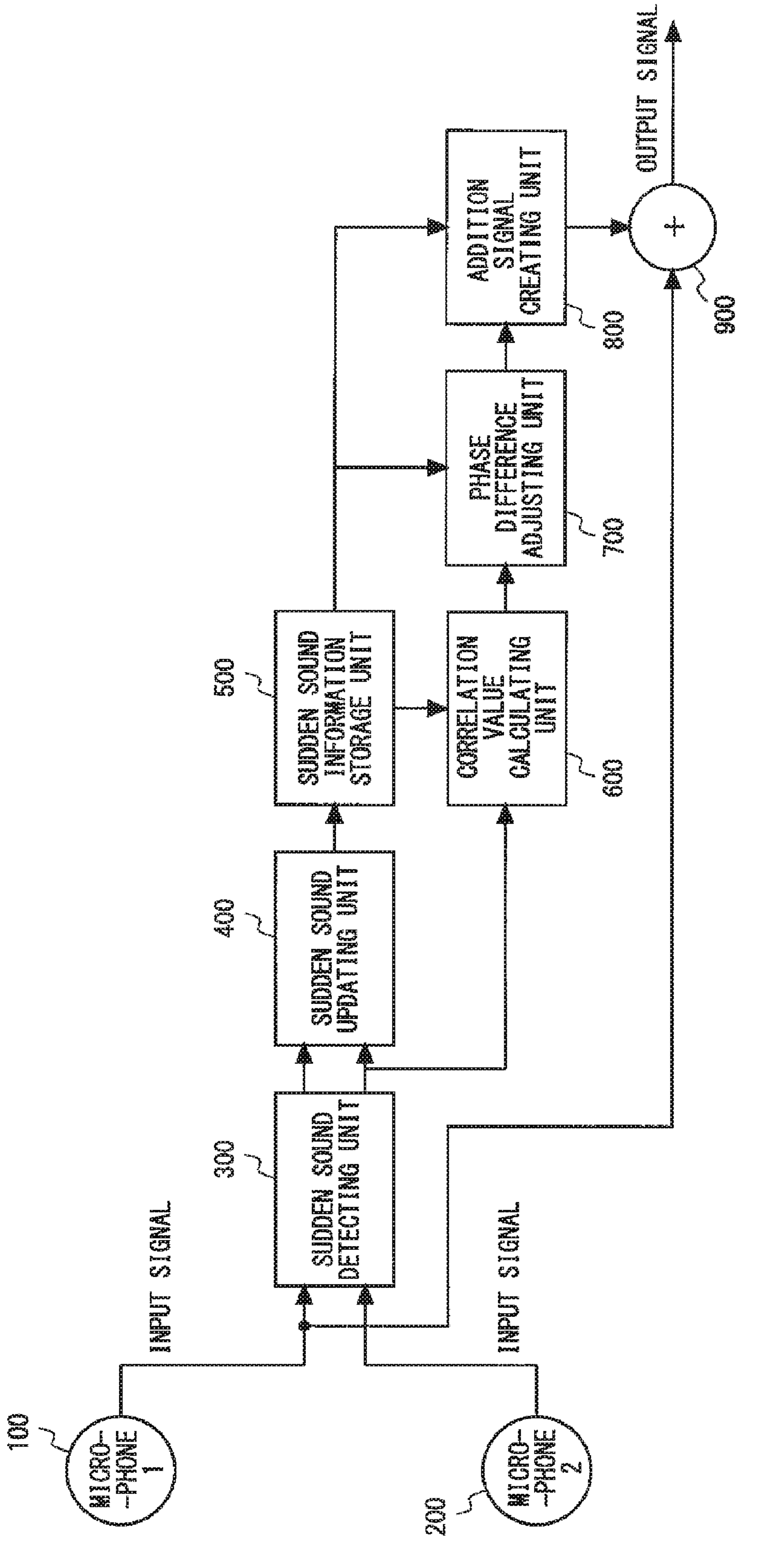
FIG. 1 is a drawing showing a configuration of a noise reduction apparatus 1000 according to an exemplary embodiment of the present invention.

Hereinafter, a preferred exemplary embodiment of the present invention shall be explained with reference to the drawings. Specific numerals and the like shown in the exemplary embodiment are illustrative only in order to facilitate understanding of the invention and do not limit the present invention. Note that in the specification and drawings of the present invention, the elements having substantially the same function or configuration are denoted by the same reference numerals, and repeated descriptions are omitted, and elements not directly related to the present invention will not be shown in the drawings.

Firstly, a configuration of a noise reduction apparatus 1000 according to a first exemplary embodiment shall be explained by referring to FIG. 1. Note that in this exemplary embodiment, persistent and periodic sudden sound shall be assumed as noise which will be reduced (see FIG. 4). As an example of the sudden sound, there is vibration sound and the like that operates for alerting a wearer when a tank capacity of an oxygen cylinder becomes less than or equal to a predetermined value.

The noise reduction apparatus 1000 includes a signal input microphone 100 for collecting mainly voice, a signal input microphone 200 for collecting mainly sudden sound, a sudden sound detecting unit 300, a sudden sound updating unit 400, a sudden sound information storage unit 500, a correlation value calculating unit 600, a phase difference adjusting unit 700, an addition signal creating unit 800, and an adder 900.

The noise reduction apparatus 1000 is a mobile communication device such as a cellular phone, radio equipment or the like. The noise reduction apparatus 1000 includes a Central Processing Unit (CPU), a storage apparatus, an input/output apparatus, a communication apparatus and the like. In the noise reduction apparatus 1000, when the CPU reads a program from the storage apparatus and executes the program, various components which will be explained later will be logically realized.

The signal input microphone 100 is a microphone for collecting mainly voice. The signal input microphone 100 outputs an input signal S1 to the sudden sound detecting unit 300.

The signal input microphone 200 is a microphone for collecting mainly the sudden sound. The signal input microphone 200 outputs an input signal S2 to the sudden sound detecting unit 300.

Figure 2:
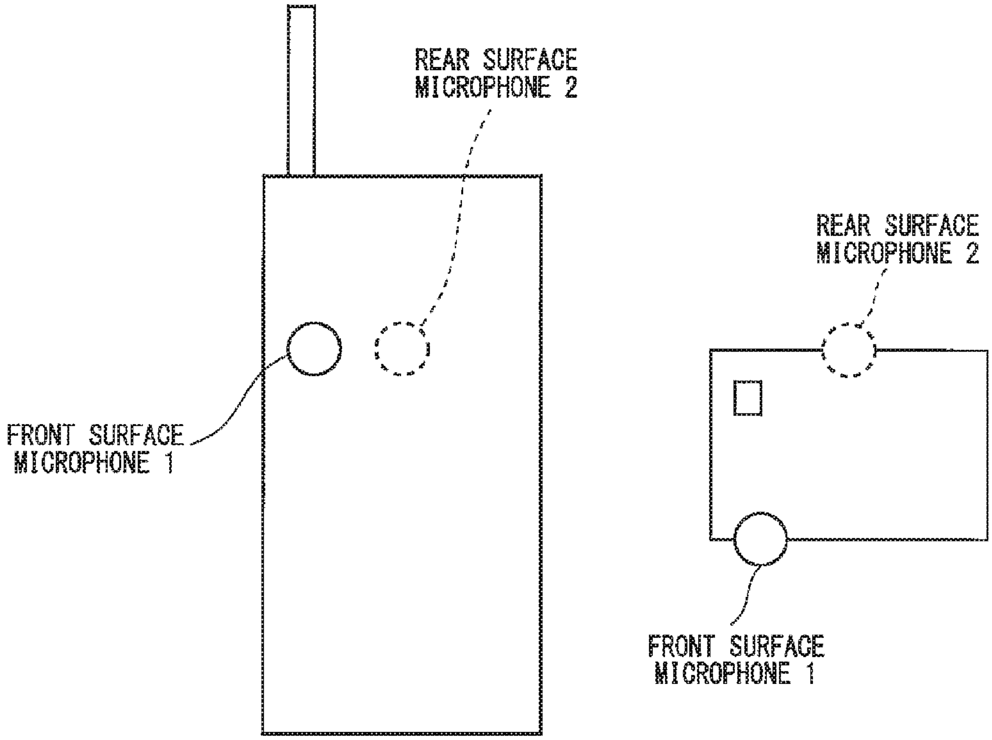
FIG. 2 is a drawing showing an arrangement example of a signal input microphone 100 and a signal input microphone 200.

An arrangement of the two microphones shall be explained by referring to FIG. 2. The left drawing of FIG. 2 is a front view of radio equipment which is the noise reduction apparatus 1000. The right drawing of FIG. 2 is a top view of the radio equipment. The signal input microphone 100 for collecting the voice is disposed on a front surface of the radio equipment. The signal input microphone 200 for collecting sound other than the voice is disposed on a rear surface of the radio equipment which is an opposite position where the signal input microphone 100 is disposed. With such a configuration, an influence of the voice on the signals input from the signal input microphone 200 can be reduced. Note that the present invention is not limited to the configuration of FIG. 2, and the signal input microphone 100 and the signal input microphone 200 may be disposed at any positions as long as the influence of the voice on the signal output from the signal input microphone 200 can be reduced.

The sudden sound detecting unit 300 detects periodic sudden sound, which is a target to be detected, in the signals S1 and S2. The sudden sound detecting unit 300 outputs presence information of the sudden sound and position information of the sudden sound to the sudden sound updating unit 400. Further, the sudden sound detecting unit 300 outputs the position information of the sudden sound detected in the signal S2 also to the correlation value calculating unit 600.

The sudden sound updating unit 400 attempts to detect a reference signal from the presence information of the sudden sound and the position information of the sudden sound in the signals S1 and S2 which has been input from the sudden sound detecting unit 300. Then, the sudden sound updating unit 400 determines as to whether or not to store the reference signal. The reference signal is the sudden sound detected in the signals S1 and S2 and is a signal used to reduce the sudden sound included in the signal S1. The sudden sound updating unit 400 transmits the reference signal to the sudden sound information storage unit 500 based on a result of the determination as to whether or not to store the reference signal.

The sudden sound information storage unit 500 receives the reference signal from the sudden sound updating unit 400. The sudden sound information storage unit 500 newly stores the reference signal or updates the reference signal which has already been stored. The sudden sound information storage unit 500 stores a plurality of pieces of the sudden sound as the reference signals. When the number of pieces of the stored sound exceeds a predetermined number, the sudden sound information storage unit 500 preferably discards old reference signals in order and stores new reference signals. When the reference signal is not stored, the sudden sound information storage unit 500 holds the reference signal that has already been stored therein as it is. The sudden sound information storage unit 500 outputs the stored reference signals to the correlation value calculating unit 600, the phase difference adjusting unit 700, and the addition signal creating unit 800.

The correlation value calculating unit 600 calculates a correlation value between the reference signal input from the sudden sound information storage unit 500 and the sudden sound detected in the signal S1 based on the position information of the sudden sound input from the sudden sound detecting unit 300. The correlation value calculating unit 600 calculates the correlation value for each of the reference signals stored in the sudden sound information storage unit 500, in other words, calculates the correlation values for the number of the reference signals. Then, the correlation value calculating unit 600 outputs the most correlated reference signal and the correlation value of the most correlated reference signal to the phase difference adjusting unit 700.

The phase difference adjusting unit 700 calculates a phase difference between the sudden sound in the signal S1 and the most correlated reference signal based on the most correlated reference signal and the correlation value that are input from the correlation value calculating unit 600. The phase difference adjusting unit 700 outputs the phase difference to the addition signal creating unit 800.

The addition signal creating unit 800 performs a process for aligning phases of the reference signal input from the sudden sound information storage unit 500 and the sudden sound in the signal S1 based on phase difference information input from the phase difference adjusting unit 700. Then, the addition signal creating unit 800 creates an addition signal for removing the sudden sound from the signal S1 and outputs the addition signal to the adder 900.

The adder 900 removes the sudden sound by adding the addition signal input from the addition signal creating unit 800 to the sudden sound in the signal S1. The adder 900 outputs the signal that is obtained by removing the sudden sound from the signal S1 via the adder.

With the above-mentioned configuration, the noise reduction apparatus 1000 detects and removes the periodic sudden sound from the input signal. This improves the difficulty in hearing due to the sudden sound while preventing the voice signals from deteriorating.

Figure 3:
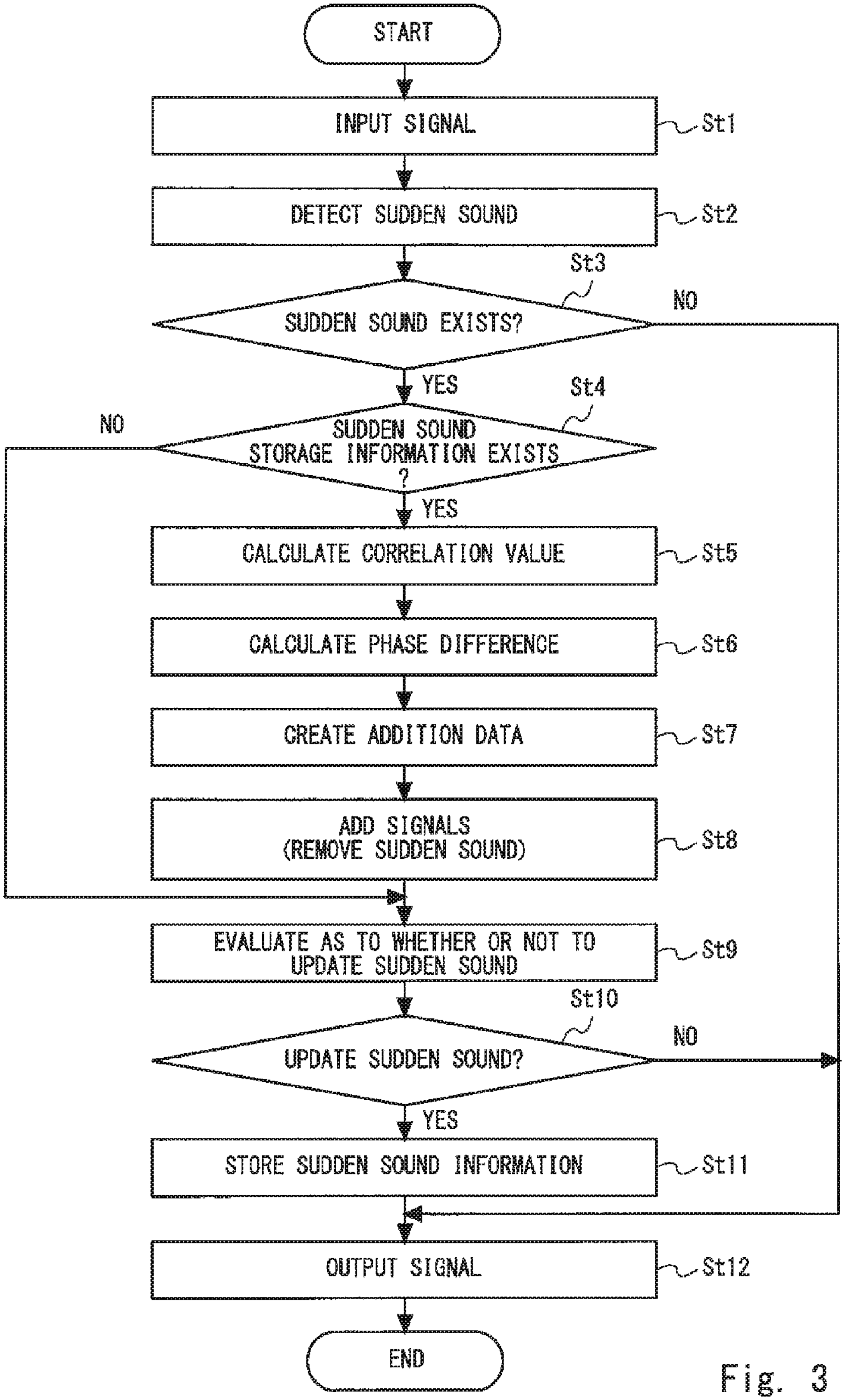
FIG. 3 is a drawing showing an operation of the noise reduction apparatus 1000.

Next, an operation of the noise reduction apparatus 1000 shall be explained by referring to a flowchart of FIG. 3.

St1:

The signal input microphone 100 and the signal input microphone 200 collect the signals S1 and S2 and outputs the signals S1 and S2, respectively, to the sudden sound detecting unit 300.

St2:

The sudden sound detecting unit 300 receives the signals S1 and S2 from the signal input microphone 100 and the signal input microphone 200, respectively. The sudden sound detecting unit 300 detects periodic sudden sound in each of the signals S1 and S2. Although any known method can be used for a method of detecting the periodic sudden sound, the method disclosed in, for example, Japanese Unexamined Patent Application Publication No. 2015-018113 is preferable. When this method is employed, the sudden sound detecting unit 300 divides the input signal S1 or signal S2 into frames of a predetermined time width. Then, the sudden sound detecting unit 300 detects the sudden sound in each frame and determines the periodicity of the detected sudden sound. This enables the sudden sound detecting unit 300 to detect the periodic sudden sound. The sudden sound detecting unit 300 detects the sudden sound using duration of a peak of a waveform signal and an amount of change at the peak of the signal S1 or S2. The sudden sound detecting unit 300 evaluates the periodicity of the sudden sound by an autocorrelation value in a modeled waveform of the sudden sound and a property of equal interval of time widths of the waveform. The sudden sound detecting unit 300 outputs the presence information of the sudden sound and the position information of the sudden sound to the sudden sound updating unit 400 as a result of detecting the periodic sudden sound.

St3:

When the periodic sudden sound is detected in the signal S2 in St2, the process proceeds to St4. When the periodic sudden sound is not detected in the signal S2, as it is not necessary to remove the sudden sound from the signal S1, and there is no information to be stored as the reference signal, the process proceeds to St12. This determination can be performed by, for example, the sudden sound updating unit 400.

Figure 4:
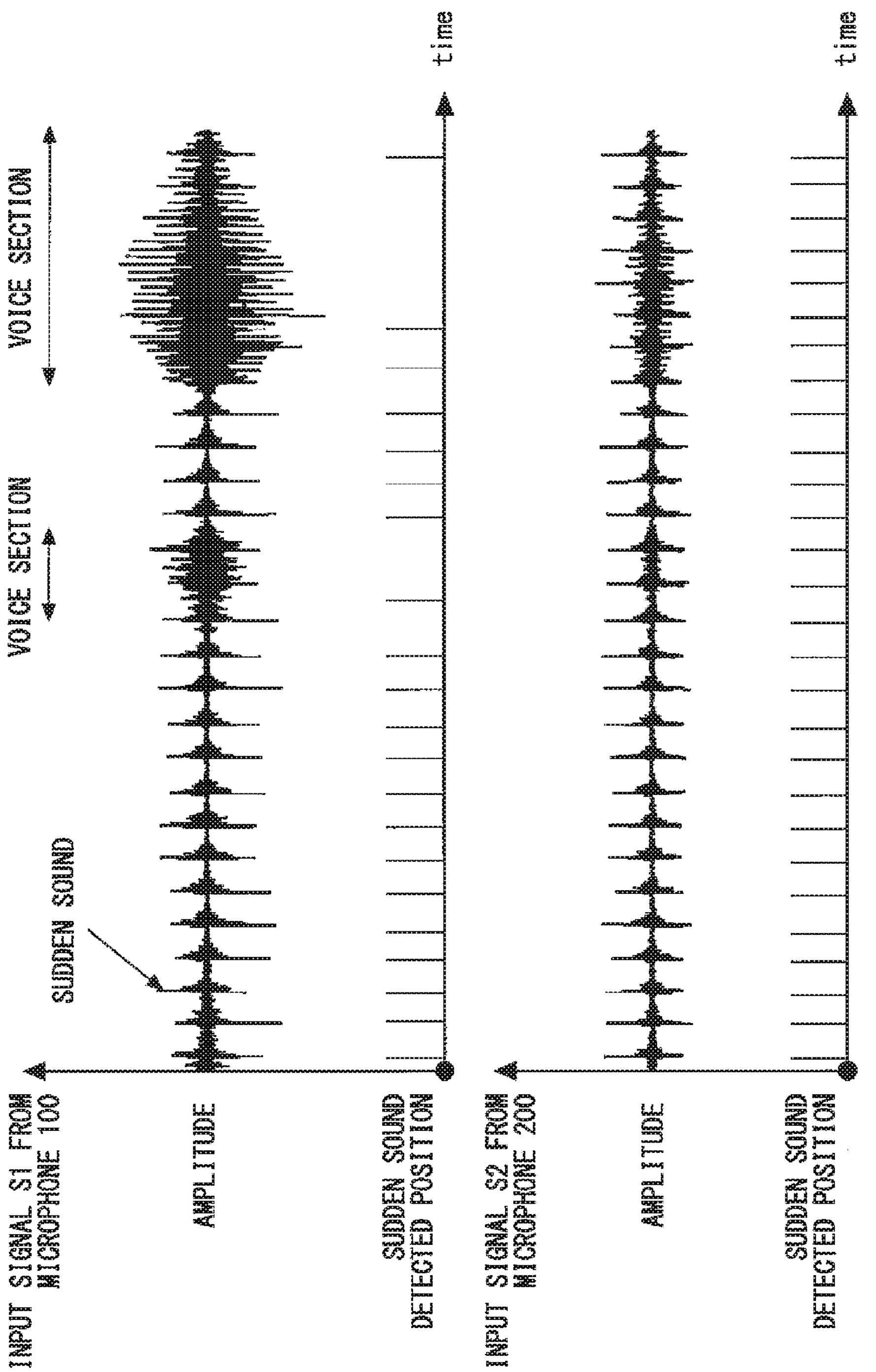
FIG. 4 is a drawing showing an example of a sudden sound detection process.

Significance of performing the above-explained determination shall be explained using the result of detecting the sudden sound in the signal S2 by referring to FIG. 4. FIG. 4 shows a correspondence relationship between an amplitude and sudden sound detected positions of the signal S1 and a correspondence relationship between an amplitude and sudden sound detected positions of the signal S2. In the signal S1, there are voice sections in which the voice signal is stronger than the sudden sound. Accordingly, there are some parts where the sudden sound detecting unit 300 cannot clearly detect the positions of the sudden sound and the detected positions are deviated, and some parts where the sudden sound cannot be detected. This is because the positions of the sudden sound cannot be correctly identified sometimes even when the method of detecting the sudden sound disclosed in Japanese Unexamined Patent Application Publication No. 2015-018113 is employed for the signal S1. In the section where voice overlaps, for example, a condition for the sudden sound may not be satisfied in the determination of the amplitude value duration or an appropriate correlation may not be obtained. On the other hand, in the signal S2, as the voice signal is weaker than the sudden sound in the voice section, the sudden sound detecting unit 300 can clearly recognize the sudden sound. Thus, the sudden sound detecting unit 300 can correctly detect the positions of the sudden sound. By using the result of detecting the sudden sound in the signal S2, a correct determination can be performed even when the voice signals are input.

St4:

The sudden sound updating unit 400 determines as to whether or not the reference signal is already stored in the sudden sound information storage unit 500. When the reference signal is stored in the sudden sound information storage unit 500, the process proceeds to St5. When the reference signal is not stored in the sudden sound information storage unit 500, as the process for removing the sudden sound from the signal S1 cannot be performed, the process proceeds to St9.

Figure 5:
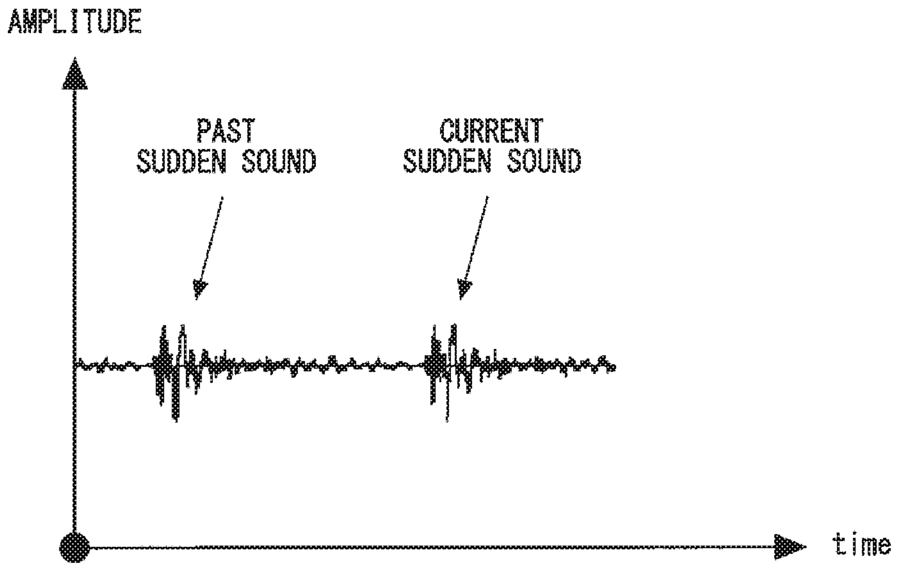
FIG. 5 is a drawing showing a relationship between current sudden sound and a reference signal.

Significance of this determination shall be explained. The noise reduction apparatus 1000 according to this exemplary embodiment stores the sudden sound detected in St2 as the reference signal. Then, the noise reduction apparatus 1000 performs a process for removing sudden sound which will be generated in the future using the stored reference signal. In other words, when the sudden sound that has been detected in the past is stored as the reference signal, the noise reduction apparatus 1000 performs the process for removing the sudden sound included in the current signal S1 using the reference signal (FIG. 5). Therefore, the noise reduction apparatus 1000 evaluates as to whether or not to execute the process for removing the sudden sound from the signal S1 according to the presence of the reference signal. Note that the process for storing the sudden sound which will be the reference signal shall be explained later.

St5:

The correlation value calculating unit 600 obtains a correlation value between the sudden sound detected in the signal S1 in St2 and the reference signal already stored in the sudden sound information storage unit 500 by Expression 1.

$$A[m] = \sum_{t=0}^{N-1} y[t+m]\cdot x[t] \qquad (1)$$

In Expression 1, A: the correlation value, y: a frame signal to be analyzed, x: the stored reference signal, t: an analyzing section (the number of samples of the reference signal), and m: an amount of shift (a phase difference component).

When the sudden sound information storage unit 500 stores a plurality of the reference signals, the correlation value calculating unit 600 calculates the correlation values for the number of the reference signals. Then, the correlation value calculating unit 600 outputs the most correlated (the greatest) correlation value and the reference signal of the most correlated correlation value to the phase difference adjusting unit 700. Note that the number of the reference signals included in the sudden sound information storage unit 500 is not limited and can be arbitrarily determined.

Significance of storing the plurality of reference signals shall be explained as follows. When voice communication is performed by a mobile communication device such as radio equipment, it is common to reduce a sampling rate to become as low as possible in terms of a reduction in voice bands and an amount of processing. Further, the sudden sound input to the radio equipment is not necessarily constant at all times due to an influence of deterioration of a mask that causes the sudden sound to be generated and shakes by a user of the radio equipment. Therefore, there is a high possibility that a phase shift is generated between one piece of sudden sound in the past which is the reference signal and the sudden sound included in the current input signal. Accordingly, in this exemplary embodiment, the sudden sound storage unit 500 holds the plurality of reference signals. Then, the correlation value calculating unit 600 selects one of the plurality of reference signals having the highest correlation with the sudden sound to be analyzed. This makes it unlikely for the phase shift between them to be generated even when the sampling rate is low and the sudden sound is not constant. Thus, the sudden sound can be stably removed.

St6:

The phase difference adjusting unit 700 calculates a phase difference between the current sudden sound, namely, the sudden sound included in the signal S1, and the reference signal output in St5.

Significance of this process shall be explained. The noise reduction apparatus 1000 according to this exemplary embodiment adds an inverted phase signal of the reference signal stored in the sudden sound information storage unit 500 to the current sudden sound, namely, the sudden sound included in the signal S1. By doing so, the noise reduction apparatus 1000 removes the sudden sound included in the signal S1. When the phases of the sudden sound included in the signal S1 and the reference signal are not sufficiently aligned, and when the sudden sound included in the signal S1 and the inverted phase signal of the reference signal are added, the amplitude increases. In this case, a phenomenon such as an increase in a noise level, addition of new noise or the like may occur. In order to prevent such a phenomenon, the phase difference adjusting unit 700 obtains the most correlated position using a cross-correlation value of the signals and aligns the phases.

Figure 6:
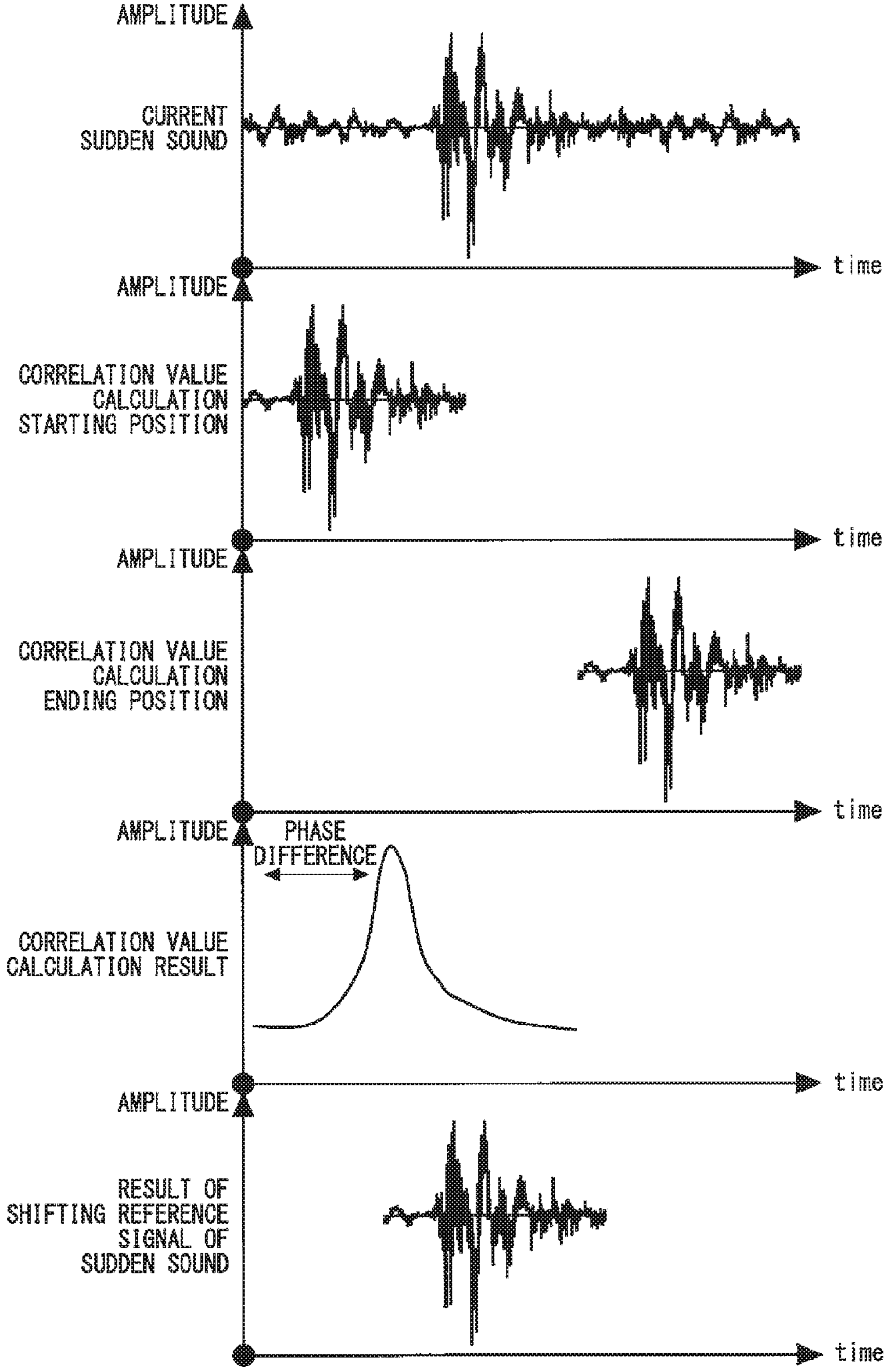
FIG. 6 is a drawing showing an example of a phase adjusting process of the reference signal.

FIG. 6 shows a relationship between the current sudden sound (the sudden sound included in the signal Si), the reference signal stored in the sudden sound information storage unit 500, and the correlation values. A result of obtaining the correlation values while shifting the stored reference signal of the sudden sound from a correlation value calculation starting position to a correlation value calculation ending position with respect to the current sudden sound is a correlation value calculation result. Although the correlation value calculation starting position may be a few samples before the current sudden sound detection point, it is not limited to this. Similarly, although the correlation value calculation ending position may be a few samples after the sudden sound detection point, it is not limited to this.

According to the correlation value calculation result, the correlation values have a peak at when the sudden sound of the frame to be analyzed (the signal Si) and the reference signal overlap. The position at this peak is the most correlated and the phases match. The phase difference adjusting unit 700 calculates a distance from a position where time=0 to the position at the peak (the number of samples). The phase difference adjusting unit 700 outputs the calculated distance to the addition signal creating unit 800 as the phase difference information indicating the phase difference. In the process which will be explained later, the addition signal creating unit 800 shifts the reference signal by the above-mentioned phase difference, and then inverts a sign. Then, the adder 900 adds the reference signal to the sudden sound in the signal S1. This reduces sudden sound components in the signal S1.

St7:

The addition signal creating unit 800 creates the addition signal for removing the sudden sound from the signal S1. The addition signal creating unit 800 shifts the reference signal by the phase difference based on the phase difference information input from the phase difference adjusting unit 700. This enables the phases of the sudden sound in the signal S1 and the reference signal to match (FIG. 6).

To be more specific, the addition signal creating unit 800 can invert the phase of the reference signal and create the addition signal using Expression 2.

$$B[i]=-(x[i])(i=0\sim t) \quad (2)$$

In Expression 2, B: the addition signal, x: the reference signal, i: the number of samples, and t: the number of reference signal samples.

St8:

The adder 900 adds the addition signal input from the addition signal creating unit 800 and the sudden sound in the signal S1. Then, the sudden sound is removed from the signal S1.

Note that although an example of removing the sudden sound from the signal S1 by adding the signal obtained by inverting the phase of the reference signal has been explained in this exemplary embodiment, the present invention is not limited to this. For example, the reference signal or the addition signal may be weighted in order to adjust an amount of removing the sudden sound depending on the situation. Alternatively, the sudden sound may be removed by subtracting the reference signal from the sudden sound of the frame to be analyzed without inverting the phase of the reference signal. By doing so, an amount of calculation regarding the phase inverting process can be reduced.

St9:

The sudden sound updating unit 400 determines as to whether or not to store the sudden sound detected in the signals S1 and S2 in St2 in the sudden sound information storage unit 500 as the reference signals.

Significance of this determination process shall be explained. The noise reduction apparatus 1000 removes the sudden sound included in the signal S1 using the previously stored reference signal to clarity the voice. If the voice is mixed in the reference signals, the voice may be removed together with the sudden sound from the signal S1 and a feeling of echo may remain in the removed signal, thereby generating voice which is hard to hear. Accordingly, it is desirable that the voice is not mixed in the reference signals.

As has been explained in St3, when the sudden sound is detected using the signal S1, the sudden sound cannot be correctly detected in the voice section. However, in the sections other than the voice section, the sudden sound can be correctly detected. Further, when the sudden sound is detected using the signal S2, the sudden sound can be correctly detected in all sections without being greatly influenced by the voice section (FIG. 4). Accordingly, when the positions of the sudden sound detected in the signal S2 match the positions of the sudden sound detected in the signal S1, the sudden sound can be evaluated as being the sudden sound with high reliability. In this exemplary embodiment, the sudden sound updating unit 400 evaluates as to whether or not the positions of the sudden sound match in the signals S1 and S2. When the positions of the sudden sound match in the signals S1 and S2, namely, when the sudden sound is evaluated as being the sudden sound, the sudden sound updating unit 400 stores the sudden sound in the signal S1 in the sudden sound information storage unit 500 as the reference signal. In this way, the sudden sound information storage unit 500 can store the correct sudden sound as the reference signal.

Moreover, in this exemplary embodiment, the sudden sound updating unit 400 updates the reference signals in the sudden sound information storage unit 500 as needed. This is because when relatively old sudden sound is used for the sudden sound included in the current signal S1, which is the sudden sound to be removed, a correlation between them may not be sufficiently ensured due to a change in a surrounding environment. There may be a case, for example, that even after the phase shift between the current sudden sound and the reference signal is corrected, the generated addition signal may not effectively reduce the current sudden sound. Accordingly, the sudden sound updating unit 400 updates the reference signal as needed in order for the sudden sound information storage unit 500 to ensure a newer reference signal.

St10:

When it is determined that the reference signal is stored in St9, the process proceeds to St11. When it is determined that the reference signal is not stored, the reference signal is not stored, and the process proceeds to St12. This branching is controlled by the sudden sound updating unit 400.

St11:

When it is determined that the reference signal is stored, the sudden sound updating unit 400 stores the sudden sound detected in the signal S1 in the sudden sound information storage unit 500. The sudden sound information storage unit 500 can store the predetermined number of reference signals. When the sudden sound information storage unit 500 already stores the predetermined number of reference signals, the sudden sound updating unit 400 discards the oldest reference signal and newly stores a latest reference signal detected in the signal S1. Suppose that the sudden sound information storage unit 500 can store two reference signals and already stores two reference signals. In this case, the sudden sound updating unit 400 rewrites the older one of the stored reference signals by the latest reference signal extracted from the signal S1. Note that when the sudden sound information storage unit 500 stores the reference signals, the number of which being less than or equal to a predetermined number, the sudden sound updating unit 400 only adds the latest reference signal detected in the signal S1.

Figure 7:
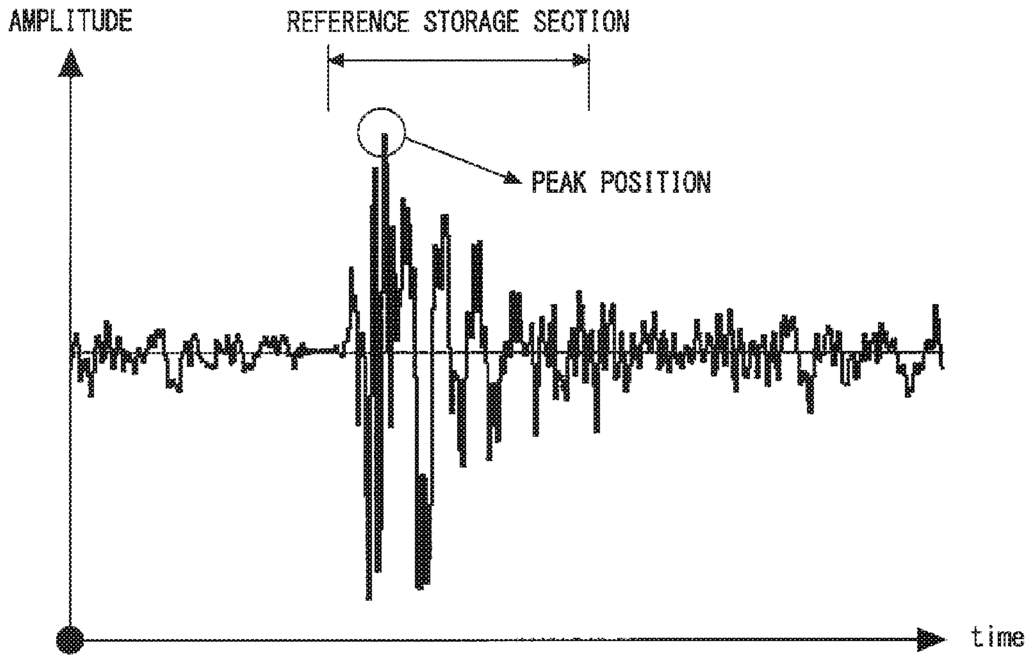
FIG. 7 is a drawing showing an example of the reference signal.

The sudden sound to be stored in the sudden sound information storage unit 500 as the reference signal shall be explained by referring to FIG. 7. FIG. 7 shows the signal S1 including the sudden sound. The reference signal aims to remove only the sudden sound. Therefore, the sudden sound updating unit 400 extracts only a reference storage section, which is the sudden sound in the signal S1, as the reference signal and writes the reference storage section in the sudden sound information storage unit 500. The sudden sound is characterized in that an amplitude suddenly increases from a normal signal level, attenuates with time, and returns to the normal signal level after the reference storage section. Thus, the sudden sound updating unit 400 firstly detects a peak (a maximum value) of the sudden sound in the signal S1. Next, the sudden sound updating unit 400 extracts samples included in a range from a predetermined number of sections (usually a few samples) before a peak position to a predetermined number of sections after the peak position as the reference storage section. Then, the sudden sound updating unit 400 stores the extracted samples in the sudden sound information storage unit 500 as the reference signal.

Moreover, as a modified example, the sudden sound information storage unit 500 may evaluate a correlation between the reference signal stored in the sudden sound information storage unit 500 and the sudden sound evaluated by the sudden sound updating unit 400 as described above. The sudden sound information storage unit 500 calculates a correlation value between the reference signal stored in the sudden sound information storage unit 500 and the sudden sound evaluated by the sudden sound updating unit 400. The sudden sound information storage unit 500 determines as to whether or not the correlation value is greater than or equal to a predetermined threshold, and thus determines as to whether or not there is a correlation between the reference signal stored in the sudden sound information storage unit 500 and the sudden sound evaluated by the sudden sound updating unit 400. When the sudden sound information storage unit 500 determines that there is no correlation between the reference signal stored in the sudden sound information storage unit 500 and the sudden sound evaluated by the sudden sound updating unit 400, the sudden sound information storage unit 500 may update the reference signal which has already been stored in the sudden sound information storage unit 500 by the sudden sound which is evaluated by the sudden sound updating unit 400 as being the reference signal. By doing so, an appropriate reference signal for removing the sudden sound can be stored.

St12:

When the sudden sound is determined to exist in St3, the adder 900 outputs the signal S1, the sudden sound of which having been removed. On the other hand, when it is determined that the sudden sound does not exist in St3, the adder 900 outputs the signal S1 input to the sudden sound detecting unit 300 as it is. Note that although the removal of the sudden sound from the signal S1 has been explained above, when the sudden sound information storage unit 500 stores the predetermined number of reference signals, the addition signal may be created using the latest reference signal.

According to this exemplary embodiment, the noise reduction apparatus 1000 evaluates the presence of the persistent and periodic sudden sound included in the input signals S1 and S2 and stores the reference signals. The noise reduction apparatus 1000 removes only the sudden sound from the input signal using the stored reference signal. Then, the deterioration of the voice signals caused by the conventional noise reduction process can be minimized, and thus the improvement in telephone call quality can be expected.

Further, the amount of processing in the method described in the present invention is less than that in the method of reducing the noise by an adaptive filter or the like, thereby reducing the processing load.

Especially according to this exemplary embodiment, the noise reduction apparatus 1000 stores the past sudden sound not including the voice as the reference signals. Accordingly, even when the voice and the sudden sound overlaps in the input signal, only the sudden sound can be effectively reduced. Thus, in a voice information transmission using the mobile communication device, clarity of the voice can be improved.

Note that the present invention is not limited to the above-described exemplary embodiment, and modifications can be made as appropriate without departing from the scope thereof. In the above exemplary embodiment, for example, an example in which after the sudden sound removal process St8, processes St9 to St11 regarding the storage of the reference signals are performed, and then the signal output process St12 is performed has been explained. However, the order of these processes can be arbitrarily switched as long as the scope of the present invention remains. For example, the processes from St9 to St11 regarding the storage of the reference signals may be performed after the signal output process St12, or the processes from St9 to St11 regarding the storage of the reference signals may be performed in parallel to the signal output process St12.

Further, in the above exemplary embodiment, the present invention has been explained using mainly hardware configurations, it is not limited to this, and arbitrary processes can be realized by causing a CPU (Central Processing Unit) to execute a computer program. In this case, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

While the invention has been described in terms of an embodiment, those skilled in the art will recognize that the invention can be practiced with various modifications within the spirit and scope of the appended claims and the invention is not limited to the examples described above.

Further, the scope of the claims is not limited by the embodiment described above.

Furthermore, it is noted that, Applicant's intent is to encompass equivalents of all claim elements, even if amended later during prosecution.

What is claimed is:

1. A noise reduction apparatus comprising:

a first microphone configured to collect mainly voice and output the voice as a first signal;

a second microphone configured to collect mainly sound other than the voice and output the sound as a second signal;

a sudden sound detecting unit configured to detect sudden sound in the first signal and the second signal;

a sudden sound information storage unit configured to store the sudden sound as one or a plurality of reference signals;

a phase difference adjusting unit configured to calculate a phase difference between the reference signal and the sudden sound included in the first signal; and an adder configured to remove the sudden sound from the first signal based on the reference signal stored in the sudden sound information storage unit.

2. The noise reduction apparatus according to claim 1, further comprising:

an addition signal creating unit configured to adjust a phase of the reference signal based on the phase difference and generate an addition signal which should be added to the first signal.

3. The noise reduction apparatus according to claim 2, further comprising:

an adder configured to add the first signal and the addition signal and remove the sudden sound from the first signal.

4. The noise reduction apparatus according to claim 1, further comprising:

a correlation value calculating unit configured to output one of the reference signals to the phase difference adjusting unit based on a result of calculation of the correlation values between the first signal and the plurality of the reference signals.

5. The noise reduction apparatus according to claim 1, further comprising:

a sudden sound updating unit configured to update some of the plurality of the reference signals that have already been stored in the sudden sound information storage unit by the reference signal that is the sudden sound detected in the first signal and the second signal.

6. The noise reduction apparatus according to claim 1, wherein the sudden sound information storage unit determines a correlation between the reference signal stored in the sudden sound information storage unit and the reference signal that is the sudden sound detected in the first signal and the second signal, and when the sudden sound information storage unit determines that there is no correlation between the reference signal stored in the sudden sound information storage unit and the reference signal that is the sudden sound detected in the first signal and the second signal, the sudden sound information storage unit updates the reference signal that has already been stored in the sudden sound information storage unit by the reference signal that is the sudden sound detected in the first signal and the second signal.

7. The noise reduction apparatus according to claim 1, wherein the sudden sound detecting unit identifies a position of the sudden sound based on the first signal and the second signal, extracts the sudden sound from the first signal based on the identified position, and uses the extracted sudden sound as the reference signal.

8. The noise reduction apparatus according to claim 1, wherein the second microphone is disposed at a distant position which is hardly influenced by the first signal.

9. A method of reducing noise comprising steps of:

collecting mainly voice and outputting the voice as a first signal;

collecting mainly sound other than the voice and outputting the sound as a second signal;

detecting sudden sound in the first signal and the second signal;

storing the sudden sound as one or a plurality of reference signals;

calculating a phase difference between the reference signal and the sudden sound included in the first signal; and removing the sudden sound from the first signal based on the reference signal stored in the step of storing the sudden sound.

10. A non-transitory computer readable medium storing a program for reducing noise that causes a computer to execute steps of:

collecting mainly voice and outputting the voice as a first signal;

collecting mainly sound other than the voice and outputting the sound as a second signal;

detecting sudden sound in the first signal and the second signal;

storing the sudden sound as one or a plurality of reference signals;

calculating a phase difference between the reference signal and the sudden sound included in the first signal; and removing the sudden sound from the first signal based on the reference signal stored in the step of storing the sudden sound.

* * * * *